United States Patent
Friend et al.

(10) Patent No.: US 6,616,146 B2
(45) Date of Patent: Sep. 9, 2003

(54) RADIAL SEAL ARRANGEMENT

(75) Inventors: Anthony D. Friend, Darien, IL (US); Ian R. Levin, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/002,168

(22) Filed: Dec. 5, 2001

(65) Prior Publication Data

US 2003/0102634 A1 Jun. 5, 2003

(Under 37 CFR 1.47)

(51) Int. Cl.$^7$ ................................ F16J 15/32
(52) U.S. Cl. .................... 277/560; 277/562; 277/573
(58) Field of Search ................ 277/551, 560, 277/562, 565, 566, 572, 573, 574

(56) References Cited

U.S. PATENT DOCUMENTS

| | | | |
|---|---|---|---|
| 2,868,566 A | | 1/1959 | Kosatka |
| 2,879,114 A | * | 3/1959 | Bowen ................ 384/486 |
| 2,950,135 A | * | 8/1960 | Adamson .............. 277/577 |
| 2,992,027 A | | 7/1961 | Wright et al. |
| 3,108,815 A | * | 10/1963 | Heynie et al. ............ 277/551 |
| 3,217,815 A | | 11/1965 | Trowbridge |
| 3,685,838 A | | 8/1972 | Malmstrom |
| 3,989,259 A | * | 11/1976 | Lorenz et al. ............ 277/574 |
| 4,026,563 A | * | 5/1977 | Bainard .................. 277/309 |
| 4,141,563 A | * | 2/1979 | Wu ....................... 277/556 |
| 4,210,339 A | * | 7/1980 | Povejsil ................. 277/552 |
| 4,327,924 A | * | 5/1982 | Wheeler ................. 277/551 |
| 4,448,461 A | | 5/1984 | Otto |
| 4,465,286 A | | 8/1984 | Deem et al. |
| 4,592,556 A | | 6/1986 | Nieman et al. |
| 4,789,166 A | * | 12/1988 | Rericha et al. ........... 277/554 |
| 4,819,952 A | * | 4/1989 | Edlund .................. 277/589 |
| 4,844,480 A | | 7/1989 | Gralka |
| 4,848,776 A | | 7/1989 | Winckler |
| 5,053,661 A | | 10/1991 | Kitamura et al. |
| 5,269,536 A | | 12/1993 | Matsushima et al. |
| 5,277,126 A | | 1/1994 | Wendt et al. |
| 5,431,415 A | | 7/1995 | Millonig et al. |
| 5,460,678 A | * | 10/1995 | Reinsma et al. .......... 156/242 |
| 5,509,667 A | | 4/1996 | Klein et al. |
| 5,647,597 A | | 7/1997 | Grochowski |
| 5,664,651 A | | 9/1997 | Miura et al. |
| 5,813,676 A | * | 9/1998 | Antonini et al. .......... 277/551 |
| 5,967,527 A | | 10/1999 | Fabro et al. |
| 6,045,137 A | | 4/2000 | Friend et al. |
| 6,047,970 A | * | 4/2000 | Friend et al. ............ 277/550 |
| 6,053,502 A | * | 4/2000 | Hallenstvedt ............ 277/572 |

* cited by examiner

*Primary Examiner*—Anthony Knight
*Assistant Examiner*—Alison K. Pickard
(74) *Attorney, Agent, or Firm*—Finnegan, Henderson, Farabow, Garrett & Dunner

(57) ABSTRACT

A radial seal arrangement for sealingly engaging an outer surface of a shaft is provided. The radial seal arrangement includes a support member that has a first leg with an outer surface that extends substantially perpendicular to a reference axis. The support member also includes a second leg that extends substantially parallel to the reference axis from the first leg to a first end. The radial seal arrangement further includes a body portion that includes an outer peripheral surface extending substantially parallel to the reference axis from the first leg to a point past the first end of the second leg, a first radial face having a relief notch and extending substantially coplanar to the outer surface of the first leg, a first sealing portion having a first chamfered surface extending from the first radial face to a first lip, and a second sealing portion separated from the first sealing portion by a first recessed area and separated from the outer peripheral surface by a second recessed area. The second sealing portion includes an edge extending substantially perpendicular to the reference axis and a second chamfered surface extending from the edge to a second lip. The first lip and second lip are spaced from each other along a line generally parallel to the reference axis.

16 Claims, 2 Drawing Sheets

RADIAL SEAL ARRANGEMENT

TECHNICAL FIELD

The present invention is directed to a radial seal arrangement. In particular, the present invention is directed to an improved radial seal arrangement for creating a seal with the surface of a moveable member.

BACKGROUND

Radial seal arrangements may be used in a variety of applications to create a seal with a moveable member. In one such application, a radial seal arrangement is used to prevent lubricating fluid from leaking from a housing that supports a moving shaft. In this type of application, the housing usually includes a counter bore that receives the radial seal arrangement and positions the radial seal arrangement at or near the exit point of the shaft from the housing.

A radial seal arrangement typically includes a rigid support member and a sealing element. When the radial seal arrangement is inserted into the counter bore in the housing, the rigid support member engages the surface of the counter bore to hold the radial seal arrangement in the housing. The support member also supports the sealing element to ensure that the sealing element engages the surface of the shaft.

A typical sealing element in a radial seal arrangement includes at least one lip that engages the surface of the shaft as the shaft moves within the housing. In some types of radial seal arrangements, such as shown in U.S. Pat. No. 6,045,137, a radial seal arrangement includes two lips that engage the surface of the shaft. The outer lip creates a dirt seal that prevents dirt, or other debris, from entering the housing, while the inner lip creates a fluid seal that prevents fluid from leaking out of the housing.

Because the lips of the radial seal arrangement must remain in contact with the surface of the shaft to maintain the seal, the radial seal arrangement is configured to have a close fit with the surface of the shaft so that the lips exert a relatively high pressure on the surface of the shaft. After extended use, the pressure of the lips on the surface of the shaft may create wear marks, such as grooves, in the surface of shaft. Excessive wear marks on the shaft may reduce the effectiveness of the radial seal arrangement and allow fluid to leak from the housing.

The rigid support member of the radial seal arrangement is typically press fit into the counter bore of the housing. During installation, the radial seal arrangement is often forced into the counter bore with a blunt instrument, such as a hammer. Striking the metal support with the blunt instrument may cause the metal support to bend or otherwise deform. This deformation may result in the creation of a gap between the metal support and the surface of the counter bore. Thus, even though the radial seal arrangement creates a tight seal with the surface of the shaft, fluid may still leak from the housing though the gap created by the deformation of the metal support during installation of the radial seal arrangement.

The radial seal arrangement of the present invention solves one or more of the problems set forth above.

SUMMARY OF THE INVENTION

To attain the advantages and in accordance with the purposes of the invention, as embodied and broadly described herein, the invention is directed to a radial seal arrangement for sealingly engaging an outer surface of a shaft. The radial seal arrangement includes a support member that has a first leg with an outer surface and that extends substantially perpendicular to a reference axis. A second leg of the support member extends substantially parallel to the reference axis from the first leg to a first end. The radial seal arrangement also includes a body portion. The body portion includes an outer peripheral surface that extends substantially parallel to the reference axis from the first leg to a point past the first end of the second leg and a first radial face that extends substantially coplanar to the outer surface of the first leg. The first radial face includes a relief notch. The body portion further includes a first sealing portion that has a first chamfered surface extending from the first radial face to a first lip and a second sealing portion that is separated from the first sealing portion by a first recessed area and is separated from the outer peripheral surface by a second recessed area. The second sealing portion includes an edge that extends substantially perpendicular to the reference axis and a second chamfered surface that extends from the edge to a second lip. The first lip and the second lip are spaced from each other along a line generally parallel to the reference axis.

In another embodiment, the present invention is directed to a sealing assembly that includes a shaft having an outer surface and a housing that has an opening configured to receive the shaft and a counter bore. The sealing assembly also includes a radial seal arrangement that is insertable into the counter bore of the housing. The radial seal arrangement includes a support member with a first leg that has an outer surface and that extends substantially perpendicular to a reference axis. A second leg of the support member extends substantially parallel to the reference axis from the first leg to a first end. The radial seal arrangement also includes a body portion having an outer peripheral surface that extends substantially parallel to the reference axis from the first leg to a point past the first end of the second leg and is configured to contact a surface of the counter bore. The body portion also has a first radial face that extends substantially coplanar to the outer surface of the first leg. The first radial face includes a relief notch. The body portion further includes a first sealing portion that has a first chamfered surface that extends from the first radial face to a first lip and a second sealing portion that is separated from the first sealing portion by a first recessed area and is separated from the outer peripheral surface by a second recessed area. The second sealing portion includes an edge that extends substantially perpendicular to the reference axis and a second chamfered surface that extends from the edge to a second lip. The first lip and second lip are configured to engage the surface of the shaft.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
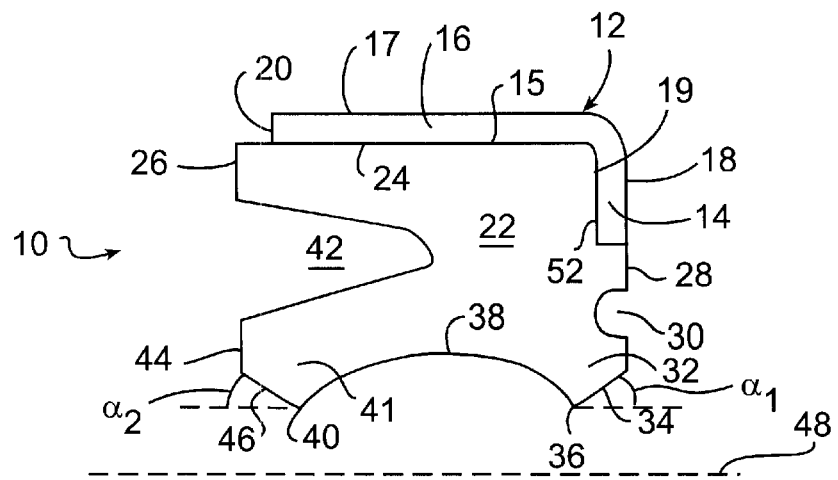
FIG. 1 is a cross-sectional view of a radial seal arrangement according to an embodiment of the present invention.
Figure 2:
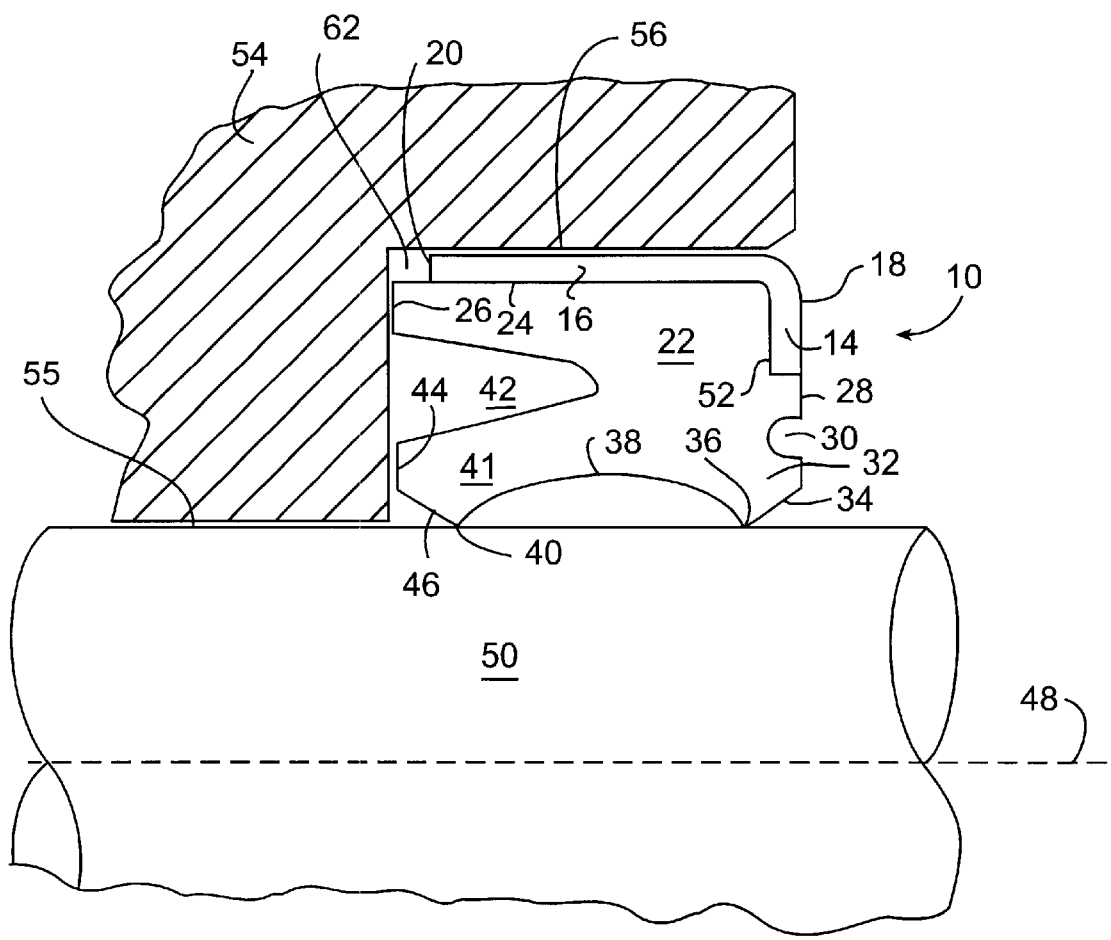
FIG. 2 is a cross-sectional view of the radial seal arrangement of FIG. 1 in engagement with a shaft.

As illustrated in FIGS. 1 and 2, a radial seal arrangement 10 includes a support 12, a body portion 22, and a reference axis 48. Support 12 may be made of a rigid material, such as, for example, metal or a hard plastic. Body portion 22 may be made of a resilient material, such as, for example, polyurethane or another elastomeric substance.

Support 12 includes a first leg 14 and a second leg 16. First leg 14 extends substantially perpendicular to reference axis 48. First leg 14 includes an inner surface 19 and an outer surface 18.

Second leg 16 extends substantially parallel to reference axis 48. Second leg 16 includes an inner surface 15 and an outer surface 17. Second leg 16 extends from first leg 14 to a first end 20. Second leg 16 may form a right angle with first leg 14. The connection between first leg 14 and second leg 16 may, however, be rounded.

Body portion 22 includes an outer peripheral surface 24 and a notch 52 that are configured to receive support 12. Inner surface 19 of first leg 14 engages notch 52 of body portion 22. Inner surface 15 of second leg 16 engages outer surface 24 of body portion. Support 12 may be attached to notch 52 and outer surface 24 of body portion 22 by a conventional process, such as, for example, adhesive bonding or vulcanization.

Outer peripheral surface 24 of body portion 22 extends substantially parallel to reference axis 48 from first leg 14 to a nose 26. When support 12 is attached to body portion 22, outer peripheral surface 24 extends along inner surface 15 of second leg 16 to a point that is past first end 20 of second leg 16. Thus, nose 26 extends past first end 20 of second leg 16.

Body portion 22 also includes a first radial face 28. In the illustrated embodiment, first radial face 28 is coplanar with outer surface 18 of first leg 14. First radial face 28 extends generally perpendicular to reference axis 48. First radial face 28 includes a relief notch 30.

As further illustrated in FIG. 1, body portion 22 includes a first sealing portion 32 and a second sealing portion 41. First sealing portion 32 is positioned adjacent first radial face 28 and includes a first chamfered surface 34 that extends from first radial face 28 to a first lip 36.

Second sealing portion 41 is spaced from first sealing portion 32 by a first recessed area 38. Second sealing portion 41 includes an edge 44, a second chamfered surface 46, and a second lip 40. Edge 44 extends generally perpendicular to reference axis 48. Edge 44 may be aligned with nose 26 on outer peripheral surface 24. Alternatively, edge 44 may be disposed at a location closer to first radial face 28 than nose 26. Second chamfered surface 46 extends from edge 44 to second lip 40.

As further shown in FIGS. 1 and 2, second sealing portion 41 is spaced from outer peripheral surface 24 by a second recessed area 42. Second recessed area 42 forms a groove or notch in body portion 22. Second recessed area 42 also allows second sealing portion 41 to flex towards outer peripheral surface 24.

As illustrated in FIG. 2, radial seal arrangement 10 may be inserted into a counter bore 56 within a housing 54. Radial seal arrangement 10 is sized such that outer surface 17 of support member 12 engages counter bore 56 with a close-tolerance fit, such as a press fit. When radial seal arrangement 10 is positioned in counter bore 56, nose 26 of body portion 22 engages a radial surface of counter bore 56. Because nose 26 extends past first end 20 of second support leg 16, a gap 62 is created between outer peripheral surface 24 and counter bore 56. The engagement of nose 26 with counter bore 56 creates a seal therebetween. This seal prevents fluid from escaping housing 54 between support 12 and counter bore 56.

As also shown in FIG. 2, a shaft 50 may be inserted into an opening 55 in housing 54 when radial seal arrangement 10 is positioned in counter bore 56. First lip 36 engages a portion of the surface of shaft 50 to create an outer seal. Second lip 40 engages another portion of the surface of shaft 50 to create an inner seal.

As illustrated in FIG. 1, both first chamfered surface 34 and second chamfered surface 46 are disposed at an angle relative to reference axis 48. With reference to FIG. 1, the angle, $\alpha_1$, of first chamfered surface 34 relative to reference axis 48 may be greater that the angle, $\alpha_2$, of second chamfered surface 46 relative to reference axis 48. The sealing properties of first lip 36 and second lip 40 may be improved by disposing first chamfered surface 34 and second chamfered surface 46 at a sharp angle relative to reference axis 48, i.e. where the angles, $\alpha_1$ and $\alpha_2$, are greater than approximately 45°.

Figure 3:
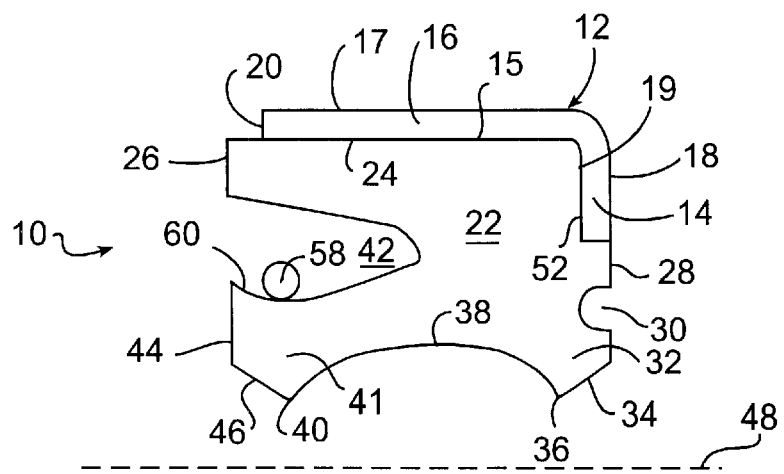
FIG. 3 is a cross-sectional view of another embodiment of a radial seal arrangement according to the present invention.
Figure 4:
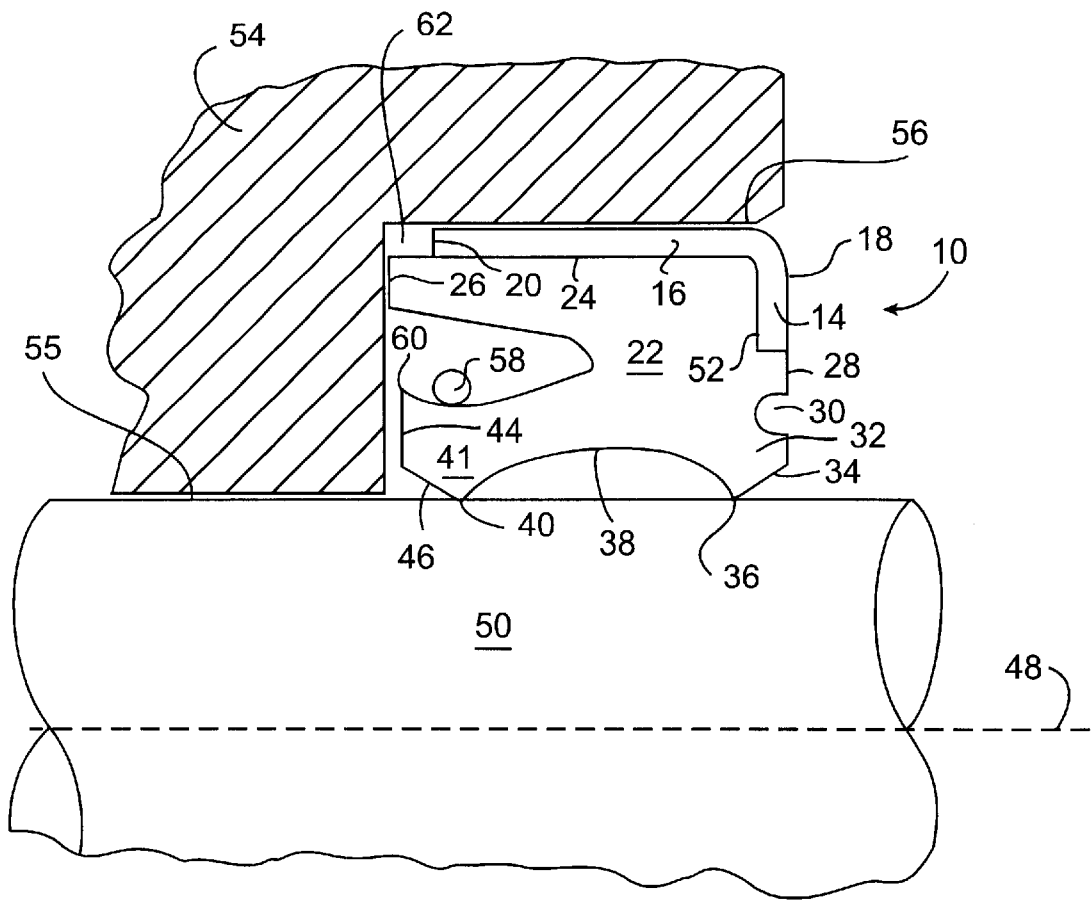
FIG. 4 is a cross-sectional view of the radial seal arrangement of FIG. 3 in engagement with a shaft.

FIGS. 3 and 4 illustrate one variation of the radial seal arrangement shown in FIGS. 1 and 2. As shown in FIGS. 3 and 4, a support element 58 may be disposed in second recessed area 42. Support element 58 extends along the perimeter of second sealing portion 41 and, thus, encircles shaft 50. Support member 58 exerts a force on second sealing portion 41 to prevent second sealing portion 41 from flexing into second recessed area 42. In other words, support member 58 acts on second sealing portion 41 to ensure second lip 40 remains engaged with the surface of shaft 50. Support element 58 may be, for example, an o-ring or a garter spring.

Second sealing portion 41 may include a retaining lip 60. Retaining lip 60 extends from second sealing portion 41 towards outer peripheral surface 24. Retaining lip 60 ensures support element 58 remains engaged with second sealing portion 41.

Industrial Applicability

As illustrated in FIGS. 2 and 4, when shaft 50 is positioned within housing 54, both first lip 36 and second lip 40 engage the surface of shaft 50. When a fluid, such as a lubricating oil, is introduced into housing 54 to provide lubrication for the movement of shaft 50, radial seal arrangement 10 prevents this fluid from escaping housing 54. The fluid may be at ambient pressure or the fluid may be pressurized to a predetermined pressure level.

The inner seal created by the engagement of second lip 40 with shaft 50 acts to prevent the fluid from escaping housing 54 along the surface of shaft 50. In some embodiments, support element 58 may act on second sealing portion 41 to ensure that second lip 40 remains in contact with the surface of shaft 50. Second chamfered surface 46 spaces second lip 40 from edge 44 of second sealing portion 41 so that second lip 40 is positioned substantially between support element 58 and shaft 50. This positioning will create a better seal and provide for better fluid retention within housing 54. The seal created by the engagement of nose 26 with the surface of counter bore 56 prevents fluid from escaping housing 54 between support 12 and counter bore 56.

The outer seal created by the engagement of first lip 36 with the surface of shaft 50 prevents dirt or debris from entering housing 54. The outer seal also provides a secondary fluid seal that prevents any fluid that passes through the inner seal from escaping housing 54. Any such fluid may be captured within first recessed area 38.

Relief notch 30 in first radial face 28 allows first sealing portion 32 to flex towards outer peripheral surface 24. This flexing will reduce the contact pressure of first lip 36 with the surface of shaft 50. It is expected that the reduction in contact pressure will result in reduced wear marks on the surface of shaft 50. Reducing the wear marks on shaft 50 may extend the service time for both the shaft and the radial seal arrangement.

Thus, the present invention has wide applications in a variety of sealing assemblies. The present invention may provide advantages in that it provides for improved sealing attributes for a radial seal arrangement.

It will be apparent to those skilled in the art that various modifications and variations can be made in the radial seal arrangement without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents

What is claimed is:

1. A radial seal arrangement for sealingly engaging an outer surface of a shaft, comprising:
   a support member including a first leg having an outer surface and extending substantially perpendicular to a reference axis and a second leg extending substantially parallel to the reference axis from the first leg to a first end; and
   a body portion including:
     an outer peripheral surface extending substantially parallel to the reference axis from the first leg to a point past the first end of the second leg;
     a first radial face extending substantially coplanar to the outer surface of the first leg, the first radial face including a relief notch,
     a first sealing portion having a first chamfered surface extending from the first radial face to a first lip, and
     a second sealing portion separated from the first sealing portion by a first recessed area and separated from the outer peripheral surface by a second recessed area, the second sealing portion including an edge extending substantially perpendicular to the reference axis and a second chamfered surface extending from the edge to a second lip, the first lip and second lip being spaced from each other along a line generally parallel to the reference axis.

2. The radial seal arrangement of claim 1, wherein the angle of the first chamfered surface relative to the reference axis is greater than the angle of the second chamfered surface relative to the reference axis.

3. The radial seal arrangement of claim 1, wherein the body portion is formed of an elastomeric material.

4. The radial seal arrangement of claim 1, wherein the support member is formed of a metallic material.

5. A sealing assembly, comprising:
   a shaft having an outer surface;
   a housing having an opening configured to receive the shaft, the housing further including a counter bore;
   a radial seal arrangement insertable into the counter bore of the housing, the radial seal arrangement including:
     a support member including a first leg having an outer surface and extending substantially perpendicular to a reference axis and a second leg extending substantially parallel to the reference axis from the first leg to a first end; and
     a body portion having an outer peripheral surface extending substantially parallel to the reference axis from the first leg to a point past the first end of the second leg and configured to contact a surface of the counter bore, a first radial face extending substantially coplanar to the outer surface of the first leg, the first radial face including a relief notch, a first sealing portion having a first chamfered surface extending from the first radial face to a first lip, and a second sealing portion separated from the first sealing portion by a first recessed area and separated from the outer peripheral surface by a second recessed area, the second sealing portion including an edge extending substantially perpendicular to the reference axis and a second chamfered surface extending from the edge to a second lip, the first lip and second lip configured to engage the surface of the shaft.

6. The sealing assembly of claim 5, wherein the radial seal arrangement further includes a support element disposed in the second recessed area.

7. The sealing assembly of claim 6, wherein the second sealing portion includes a retaining lip configured to engage the support element.

8. The sealing assembly of claims 6, wherein the support element is a garter spring.

9. The sealing assembly of claim 6, wherein the support element is an o-ring.

10. The sealing assembly of claim 5, wherein the angle of the first chamfered surface relative to the reference axis is greater than the angle of the second chamfered surface relative to the reference axis.

11. The sealing assembly of claim 5, wherein the body portion is formed of an elastomeric material.

12. The sealing assembly of claim 5, wherein the support member is formed of a metallic material.

13. A radial seal arrangement for sealingly engaging an outer surface of a shaft, comprising:
   a support member including a first leg having an outer surface and extending substantially perpendicular to a reference axis and a second leg extending substantially parallel to the reference axis from the first leg to a first end;
   a body portion including:
     an outer peripheral surface extending substantially parallel to the reference axis from the first leg to a point past the first end of the second leg;
     a first radial face extending substantially coplanar to the outer surface of the first leg, the first radial face including a relief notch,
     a first sealing portion having a first chamfered surface extending from the first radial face to a first lip, and
     a second sealing portion separated from the first sealing portion by a first recessed area and separated from the outer peripheral surface by a second recessed area, the second sealing portion including an edge extending substantially perpendicular to the reference axis and a second chamfered surface extending from the edge to a second lip, the first lip and second lip being spaced from each other along a line generally parallel to the reference axis; and
   a support element disposed in the second recessed area.

14. The radial seal arrangement of claim 13, wherein the second sealing portion includes a retaining lip configured to engage the support element.

15. The radial seal arrangement of claim 13, wherein the support element is a garter spring.

16. The radial seal arrangement of claim 13, wherein the support element is an o-ring.

* * * * *